United States Patent
Ito et al.

(10) Patent No.: US 8,076,255 B2
(45) Date of Patent: Dec. 13, 2011

(54) CASTABLE REFRACTORY

(75) Inventors: Satoru Ito, Futtsu (JP); Hitoshi Nakamura, Futtsu (JP); Taijiro Matsui, Futtsu (JP); Michio Nitta, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 721 days.

(21) Appl. No.: 12/084,015

(22) PCT Filed: Oct. 27, 2006

(86) PCT No.: PCT/JP2006/322046
§ 371 (c)(1),
(2), (4) Date: Apr. 22, 2008

(87) PCT Pub. No.: WO2007/049822
PCT Pub. Date: May 3, 2007

(65) Prior Publication Data
US 2009/0130618 A1    May 21, 2009

(30) Foreign Application Priority Data
Oct. 27, 2005   (JP) .................. 2005-312485

(51) Int. Cl.
*C04B 35/101* (2006.01)
*C04B 35/103* (2006.01)
*C04B 35/66* (2006.01)
*F27B 9/34* (2006.01)

(52) U.S. Cl. .......... 501/124; 501/89; 501/128; 501/129; 501/130; 428/698; 428/702; 428/426; 266/280

(58) Field of Classification Search .................. 501/128, 501/129, 130, 124, 89; 428/702, 703, 698, 428/426; 266/280
See application file for complete search history.

(56) References Cited

U.S. PATENT DOCUMENTS

| 3,992,214 A | * | 11/1976 | Petrak et al. ............... 501/89 |
| 4,102,695 A | * | 7/1978 | Claverie .................. 501/124 |
| 4,218,254 A |   | 8/1980 | Kiehl et al. |
| 5,283,215 A | * | 2/1994 | Hosokawa et al. ........... 501/120 |
| 5,338,711 A | * | 8/1994 | Fitch et al. ................ 501/89 |

(Continued)

FOREIGN PATENT DOCUMENTS
EP    0 558 939    9/1993
(Continued)

OTHER PUBLICATIONS

European Search Report in European Application No. EP 06 82 2964 dated Apr. 8, 2010.

(Continued)

*Primary Examiner* — Karl Group
(74) *Attorney, Agent, or Firm* — Kenyon & Kenyon LLP

(57) ABSTRACT

To provide a long-life refractory capable of maintaining durability under severe conditions. The castable refractory comprises a mixture containing at least one of 2 to 10 mass % of silicon carbide and 3 to 10 mass % of chamotte, as an auxiliary raw material, and a binder material, with the remaining balance being one or more main raw materials selected from corundum, mullite, bauxite, chamotte, talc and silica, and is used in an environment exposed to an alkali component-containing hot gas atmosphere. In an alkali component-containing gas atmosphere at a high temperature (750° C. or more), silicon carbide and/or chamotte are vitrified to a thickness of 1 mm or less in the surface layer of the refractory to prevent the alkali component-containing gas from intruding inside of the refractory.

5 Claims, 6 Drawing Sheets

U.S. PATENT DOCUMENTS

| | | | |
|---|---|---|---|
| 5,753,572 A * | 5/1998 | Langenohl et al. | 501/89 |
| 5,856,251 A * | 1/1999 | Teranishi et al. | 501/89 |
| 2002/0119885 A1 | 8/2002 | Liever et al. | |
| 2004/0204305 A1 | 10/2004 | Liever et al. | |
| 2005/0053892 A1 | 3/2005 | Shiromizu et al. | |
| 2006/0014622 A1 * | 1/2006 | Liever et al. | 501/89 |

FOREIGN PATENT DOCUMENTS

| | | |
|---|---|---|
| EP | 1 234 807 | 8/2002 |
| JP | 58-2270 | 1/1983 |
| JP | 2-221164 A | 9/1990 |
| JP | 2-302508 A | 12/1990 |
| JP | 03205367 * | 9/1991 |
| JP | 04325466 * | 11/1992 |
| JP | 6-206764 A | 7/1994 |
| JP | 2986783 * | 12/1999 |
| JP | 2986785 * | 12/1999 |
| JP | 2000-327436 A | 11/2000 |
| JP | 2001-294942 A | 10/2001 |
| WO | WO 98/00373 | 1/1998 |

OTHER PUBLICATIONS

Henek, M., et al., "The influence of alkalis on specific parts of the refractory concrete matrix," *XV Conference Proceedings*, Prague, May 2005.

Pitak, N. V., et al., "Resistance of silicon carbide refractories to the action of carbon monoxide, alkalis, and slag," *Ukranian Scientific-Research Institut of Refractories*, No. 2, Feb. 1988, pp. 1-4.

Pitak, N. V., et al., "Mullite-corundum refractories with silicon carbide for linings of transportable micers," *Refractories*, vol. 36, No. 3-4, Jan. 1995, pp. 97-100.

\* cited by examiner

CASTABLE REFRACTORY

TECHNICAL FIELD

The present invention relates to a castable refractory used, for example, in an environment exposed to an alkali component-containing a hot gas atmosphere after lining a kiln, a furnace or the like where the furnace gas contains an alkali component.

BACKGROUND ART

Reduced iron obtained by reducing iron-making dust or sludge to remove impurities, such as zinc, is reused as a raw material or the like of a blast furnace. FIG. 9 is a view showing a rotary hearth-type reducing furnace 100 used for reducing iron-making dust or sludge.

The rotary hearth furnace 100 comprises a hollow annular furnace 200, an annular hearth 300 swiveling in the furnace, and a predetermined number of burners 400 provided on the side wall of the furnace 200. The furnace 200 is lined on the inner side of the iron-made outer wall 210 with an alumina-silica refractory 220 to withstand high temperatures of 1,000 to 1,300° C. in the furnace.

The composition of the refractory is disclosed in Unexamined Japanese Patent Publication (Kokai) No. 06-206764.

When iron-making dust or sludge caked into a pellet form is supplied to the hearth, hearth 300 with pellets 500 thereon swivels in the furnace. During swiveling in the furnace, impurities such as zinc contained in the pellet 500 are removed by the heating and warming from the burner 400. Then, the pellet 500 deprived of impurities is recovered.

The thus-recovered pellet 500 is recycled.

The iron-making dust or sludge contains an alkali component such as sodium (Na) or potassium (K) in the form of oxide, carbonate, chloride or the like, and therefore, when the pellet 500 is heated and warmed in the furnace, the alkali component in the form of oxide, carbonate, chloride or the like vaporizes as it is, or sodium (Na), potassium (K) or the like after decomposition vaporizes, and as a result, the gas in the furnace contains an alkali component. The alkali component vaporized intrudes into the refractory and reacts with alumina and silica in the refractory. When the alkali component reacts with alumina and silica in the refractory, kaliophilite ($K_2O.Al_2O_3.2SiO_2$), leucite ($K_2O.Al_2O_3.4SiO_2$) and the like are produced as reaction products causing great volumetric expansion. This volumetric expansion generated partially in the refractory 220 has a problem that the refractory 220 falls off and the life of the refractory 220 decreases.

For example, Japanese Unexamined Patent Publication (Kokai) No. 06-206764 discloses a refractory used in a high-temperature alkali atmosphere, where the component percentages are from 92 to 98 mass % of $Al_2O_3$ and from 2 to 8 mass % of CaO.

According to such a construction, the grain boundary bonding part which is $6Al_2O_3 \cdot CaO$ is supposed to coat $Al_2O_3$ forming the aggregate, so that the reaction and erosion of $Al_2O_3$ by the alkali component-containing gas atmosphere can be prevented from proceeding.

However, when the pellet 500 is heated and the temperature is elevated, water vaporizes from the pellet 500 and a problem arises that according to the component percentages disclosed in Japanese Unexamined Patent Publication (Kokai) No. 06-206764, CaO contained reacts with the water to cause volumetric expansion associated with slaking of the refractory and the structure of the refractory cannot be maintained.

Accordingly, a refractory having high durability is demanded as the refractory of a furnace for reducing the iron-making sludge.

An object of the present invention is to provide a long-life refractory capable of maintaining durability under severe conditions, such as an alkali component-containing gas atmosphere at high temperatures.

DISCLOSURE OF THE INVENTION

The castable refractory of the present invention is used in an environment exposed to an alkali component-containing hot gas atmosphere and comprises a mixture containing at least one of 2 to 10 mass % of silicon carbide and 3 to 10 mass % of chamotte, as an auxiliary raw material, and a binder material, with the balance being one or more main raw materials selected from corundum, mullite, bauxite, chamotte, talc and silica.

The inside of the furnace lined with the refractory having the above-described construction, is heated to elevate the temperature. Then, silicon carbide and/or chamotte, which are auxiliary raw materials, are exposed to the surface layer portion of the refractory lining the inside of the furnace, and which react with an alkali component contained in the in-furnace hot gas and after melting, are vitrified.

When the surface layer of the refractory is thus vitrified, the gas in the furnace is prevented from intruding inside the refractory.

For example, in the case where the gas in the furnace contains an alkali component, if the gas in the furnace intrudes into the refractory, the alkali component reacts with corundum, mullite or the like to cause volumetric expansion. Due to volumetric expansion by such a reaction with the alkali component, the refractory falls off and the life of the refractory greatly decreases.

In the present invention, silicon carbide and/or chamotte contained as an auxiliary raw material are melted to form a vitrified layer on the surface, and the vitrified layer prevents intrusion of a gas, so that the durability of the refractory can be enhanced by preventing the refractory from expansion due to a reaction product and the life can be extended.

The content of silicon carbide is from 2 to 10 mass %, because if the silicon carbide content is less than 2 mass %, the vitrified layer is an incomplete film and cannot block the intrusion of a gas. However, if the silicon carbide content exceeds 10 mass %, the reaction product resulting from oxidation of the silicon carbide causes great volumetric expansion and the refractory falls off.

The content of chamotte is from 3 to 10 mass %, because if the chamotte content is less than 3 mass %, the vitrified layer is an incomplete film and cannot block the intrusion of a gas. However, if the chamotte content exceeds 10 mass %, the melting point of the entire refractory becomes too low and the refractory does not function as a refractory.

The binder material is a material which maintains a castable state without bonding the powder particles to each other at ordinary temperature and when warmed to a predetermined temperature or more, bonds the powder particles. Examples of the binder material include those obtained by adding ultrafine alumina powder and/or ultrafine silica powder to an alumina cement or further adding clay thereto.

The content of the binder material is preferably 5 mass % or more to ensure strength, and preferably 22 mass % or less to maintain corrosion resistance.

The content of the main raw material is preferably from 58 to 93 mass % to maintain the strength of the refractory.

The hot service temperature of the refractory of the present invention is preferably from 750 to 1,400° C.

If it is not 750° C. or more, silicon carbide and/or chamotte cannot be melted to produce a glass coat.

However, when having been previously heated to 750° C. or more for a predetermined time, the refractory can be used at not more than 1,400° C. which is the fire resistance temperature of the refractory.

A service temperature exceeding 1,400° C. is not preferred, because the glass coat readily melts.

Also, at the time when silicon carbide and/or chamotte which are auxiliary raw materials each react with an alkali component contained in the in-furnace hot gas and after melting, is vitrified. The concentration of the alkali component is preferably 0.1 vol % or more for forming the vitrified layer to a sufficiently large thickness.

For example, in the case of using the iron-making dust or sludge as the material to be heated, sodium (Na) or potassium (K) as an alkali component is contained in the form of oxide, carbonate or chloride, and therefore, examples of the alkali component which the atmosphere gas is considered to contain resulting from heating, partial decomposition or reduction include $K_2O$ and $Na_2O$ which are an oxide form, K and Na which are a metal vapor, carbonates thereof and chlorides thereof. Out of these components, $K_2O$ and $Na_2O$ which are an oxide form, and K and Na which are a meal vapor, have a great effect of volumetrically expanding the refractory.

Accordingly, when $K_2O$, $Na_2O$, K or Na is contained at a concentration of 0.1 vol % or more in the gas components, the refractory of the present invention is particularly effective and is preferred. On the other hand, considering the corrosion of post-treating equipment or the deposition of dust, the upper limit of the alkali component concentration in the gas is preferably 10 vol % or less.

Incidentally, the alkali component concentration in the gas is difficult to measure and in practice, the concentration is calculated from the alkali component concentration in the body to be heated, the amount of the body to be heated, the inner volume of the objective furnace, and the like.

Also, although a gas of the alkali component is generated as described above, other examples of the component in the atmosphere gas include $O_2$, $CO_2$, $H_2O$ and $N_2$ in the case of heating in an oxidation atmosphere, and CO and $H_2$ in the case of heating in a reducing atmosphere.

In the present invention, the binder material preferably comprises 10 mass % or less of alumina cement and 7 mass % or less of ultrafine alumina powder and/or 5 mass % or less of ultrafine silica powder.

In such a construction, when the content of alumina cement is 10 mass % or less, the volumetric expansion of alumina cement does not have a significant effect and the function as a refractory can be fulfilled. The lower limit of the alumina cement content is not particularly specified but is preferably 3 mass % or more from the standpoint of ensuring the strength.

The content of the ultrafine alumina powder is preferably 7 mass % or more, because if it exceeds 7 mass %, the effect of volumetric expansion resulting from the reaction with an alkali component in the gas becomes large. Also, the content of the ultrafine silica powder is 5 mass % or less for the same reason. The lower limit of the ultrafine alumina powder or ultrafine silica powder content is not particularly specified, but is preferably 1 mass % or more from the standpoint of dispersing the powder and ensuring the strength.

The ultrafine powder is added for the purpose of ensuring the flowability by combining with a dispersing material and bringing out high strength by reacting with alumina cement, but in order to satisfactorily achieve these purposes, the ultrafine alumina powder and the ultrafine silica powder both preferably have a particle diameter of 10 μm or less. Also, in both the ultrafine alumina powder and the ultrafine silica powder, the lower limit of the particle diameter is not particularly specified but is preferably 1 μm or more from the standpoint of dispersing the powder and ensuring the strength.

In the present invention, the at least one of 2 to 10 mass % of silicon carbide and 3 to 10 mass % of chamotte contained preferably has a particle diameter of 200 μm or less.

In such a construction, when the particle diameter of silicon carbide and/or chamotte is 200 μm or less, the silicon carbide and/or chamotte readily melts to easily form a glass film on the refractory surface.

As a result, a glass film is formed on the refractory surface and prevents a gas from intruding into the inside of the refractory, and the durability performance of the refractory can be enhanced.

The lower limit of the particle size of silicon carbide and/or chamotte is not particularly specified, but is preferably 10 μm or more, because if the particle diameter is less than 10 μm, a glass film is formed resulting from melting and the effect is saturated.

Also, the present invention is a refractory formed inside of a kiln, wherein, after lining the inside of a furnace with the castable refractory described above, the refractory is used in an environment exposed to an alkali component-containing hot gas atmosphere, and a vitrified layer is produced as a surface layer to a thickness of 1 mm or less.

More specifically, when the refractory of the present invention is exposed to a gas containing an alkali component as the in-furnace gas component at a hot in-furnace temperature of 750 to 1,400° C., the alkali component reacts with silicon carbide and/or chamotte added as an auxiliary raw material to produce a vitrified layer. It is important that the thickness of the vitrified layer is 1 mm or less. Because, if the thickness exceeds 1 mm, the vitrified layer will fall off when furnace is cooled repaired in order to be. The lower limit of the thickness of the vitrified layer is not particularly specified, but is preferably 30 μm or more, because if the thickness is less than 30 μm, intrusion of the alkali component-containing gas cannot always be satisfactorily prevented.

Incidentally, in the case of using the refractory of the present invention in furnace, the thickness of the vitrified layer is usually 200 μm or less in many cases.

In the invention of the above-described refractory, it is preferred that after lining with the castable refractory, a solution containing silica ($SiO_2$), an alkali metal oxide (e.g., $LiO_2$, $Na_2O$) and alumina ($Al_2O_3$), which melts at 750° C. or more, is coated on the refractory surface and the refractory is then exposed to an alkali component-containing hot gas atmosphere.

The solution used here is a solution containing silica as the main component and containing an alkali metal oxide and alumina, and the component percentages in the solution are preferably from 70 to 97 mass % of silica, from 2 to 10 mass % of an alkali metal oxide, and from 1 to 20 mass % of alumina. Other than these components, the solution may contain, for example, MgO and $B_2O_3$.

The solution preferably melts at 750° C. to have a viscosity of 0.1 Pa·s or more at 1,200° C. as measured by a rotary cylinder method (see, for example, *Yotetsu.Yoshi no Busseichi Binran (Handbook of Physical Values of Molten Iron.Molten Slag*, edited by ISIJ, page 35) and forms a film with a thickness of 50 μm to less than 500 μm.

If the film thickness is less than 50 μm, the effect of blocking the alkali-containing gas is low. On the other hand, the film thickness is set to be less than 500 μm, because in view of solution characteristics, coating needs to be performed a plurality of times to increase the workload, despite no change in the effect of blocking the alkali component-containing gas even if the film thickness is not less than 500 μm.

The temperature of which the viscosity of the solution coated is based is 1,200° C., and this is considered to correspond to the service temperature in the furnace for treating a gas. The upper limit of the viscosity of the solution is not particularly specified, but is preferably 0.5 Pa·s or less in view of workability.

The above-described solution is sprayed at ordinary temperature and dried to remove the water content and thereby vitrified. Thereafter, the temperature is raised to the operating temperature and when the in-furnace temperature reaches 750° C. or more, the solution partially starts to melt to cover the entire refractor and reacts with the alkali component-containing gas at the operation to form a vitrified layer, whereby intrusion of the alkali component-containing gas can be prevented. Incidentally, the melting starts at 750° C. or more, because the volatilization temperature of the alkali component-containing gas is around 750° C.

By coating the solution in this way to form a film, the alkali component-containing gas can be prevented from intruding into the refractory as compared with the case of not coating the solution, and the life of the refractory can be extended.

However, even if the above-described solution is coated in this way to form a film for the purpose of blocking the alkali component-containing gas, the film used in a hot state is separated or melted. In this case, the refractory of the present invention is hot-reacted with the alkali component in the gas and after melting, is vitrified to form a vitrified layer, so that the alkali component-containing gas can be prevented by the vitrified layer from intruding into the refractory.

The present invention also provides a kiln. Specifically, the kiln has the following construction, i.e. the kiln of the present invention is a kiln wherein a refractory is applied to a plurality of sections by lining the section with the castable refractory described above and a compressible fire-resistant material is applied between adjacent sections, and wherein the preset expansion allowance of each section is in the range of the following formula (1) with respect to the theoretical expansion (D) of the refractory at the service temperature.

Also, the kiln of the present invention comprises a plurality of sections having formed therein the refractory described above, and a compressible fire-resistant material applied between adjacent sections, wherein the preset expansion allowance of each section is in the range of the following formula (1) with respect to the theoretical expansion (D) of the refractory at the service temperature.

$$0.5 \times D \leq pA + \sum_{i=0}^{n} Bi \leq 2 \times D \tag{1}$$

A: the distance to the adjacent section,
p: the percentage compressibility of the compressible fire-resistant material,
Bi: the length in the width direction of a cut line provided at least on the in-furnace side of the castable refractory constituting the section,
D: the theoretical expansion of the castable refractory at the service temperature, and
i and n: an integer of 0 or more.

Generally, in a kiln of which the treatment target is a gas, the refractory readily expands due to the hot state and therefore, at the time of lining the inside of the furnace with the castable refractory, the refractory is applied by dividing it into a plurality of sections each comprising a castable refractory, and a predetermined gap from the adjacent section is created so that the refractories when heated and expanded can be prevented from squeezing together and protruding.

Also, when a cut line is provided on at least the in-furnace side of the castable refractory, the space corresponding to the length in the width direction of this cut line has an effect of preventing the heated and expanded refractories from squeezing together and protruding (hereinafter, the "predetermined gap between castable refractory sections" and "space by the cut line"are sometimes collectively referred to as an "expansion allowance").

Furthermore, a compressible fire-resistant material is applied between adjacent sections so that expansion of the refractory can be absorbed.

This is specifically described by referring to FIG. 1. As shown in FIG. 1, the expansion allowance includes mainly two cases, i.e., a case of piecing the refractory to its back surface and filling it with a fire-resistant material 102 having a high percentage compressibility so as to cause no gas leakage, and a case of providing a cut line 105 on the surface at certain intervals (hereinafter referred to as a "score line"). The construction having the expansion allowance shown in FIG. 1 comprises a brick 103 for heat insulation on the back surface of the refractory 101, and an iron skin 104 on the back surface thereof.

The fire-resistant material 102 used for filling the space between adjacent sections is a compressible fire-resistant material, and examples thereof include, in the case of a furnace treating a gas, an $Al_2O_3$—$SiO_2$-based ceramic fiber and an MgO—$SiO_2$-based ceramic fiber.

The expansion allowance is previously set at the time of lining a kiln with a refractory, and the theoretical expansion of the refractory at the service temperature is used as an index therefor. The theoretical expansion can be determined from the hot linear expansion coefficient measured by the method prescribed in JIS R 2555.

Usually, in a furnace for treating a gas, so that no gas leaks from the furnace, the refractory is applied by setting the expansion allowance to a value of less than 0.5 times the theoretical expansion, whereby refractory sections are allowed to strongly squeeze the compressible fire-resistant material from both sides and the gas leakage can be prevented. In the present invention, the expansion allowance previously set in this way is defined as a "preset expansion allowance".

On the other hand, from a new discovery that when an alkali component-containing gas is present in the furnace, i.e., when the refractory is exposed to an alkali component-containing hot gas atmosphere, expansion of the refractory increases, and when oxygen is present in the gas atmosphere in using silicon carbide as an auxiliary raw material, $SiO_2$ is produced by the reaction of the silicon carbide with this oxygen to thereby increase expansion of the refractory, has been newly found to be important to increase the preset expansion allowance than previously.

Specifically, it has been found that the preset expansion allowance is preferably from 0.5 to 2 times the theoretical expansion (D) of the castable refractory at the service temperature, and when this is expressed in the form of a formula as follows:

$$0.5 \times D \leq pA + \sum_{i=0}^{n} Bi \leq 2 \times D \quad (1)$$

A: the distance to the adjacent section, p: the percentage compressibility of the compressible fire-resistant material, Bi: the length in the width direction of a cut line provided at least on the in-furnace side of the castable refractory constituting the section, D: the theoretical expansion of the castable refractory at the service temperature, and i and n: an integer of 0 or more.

In the middle of formula (1), "pA" indicates the length in the width direction when the compressible fire-resistant material is compressed at the service temperature, and "$\Sigma B_i$," indicates the sum of length in the width direction, and i and n are integers of 0 or more, because the preset expansion allowance is sometimes set using only the distance from the adjacent section at the time of applying the compressible fire-resistant material.

If the preset expansion allowance is less than 0.5 times the theoretical expansion (D), not only the reaction between the alkali component-containing gas and the refractory is accelerated to increase the expansion of the refractory and close up the refractories with each other but also the reaction layer with alkali is separated at the cooling of the furnace to decrease the thickness of the refractory. Particularly, when oxygen is present in the gas atmosphere in which silicon carbide is used, $SiO_2$ is produced by the reaction with this oxygen to cause greater expansion of the refractory and the refractories are disadvantageously closed up with each other more prominently.

On the other hand, if the preset expansion allowance exceeds 2 times the theoretical expansion (D), the sealing of the compressible fire-resistant material applied to the space between adjacent refractory sections decreases and this may disadvantageously allow the in-furnace gas to flow around the back surface of the refractory and make the iron skin red-hot, which is the furnace shell.

According to the present invention, silicon carbide and/or chamotte contained as an auxiliary raw material are melted to form a vitrified layer on the surface and prevent intrusion of a gas, so that the refractory can be prevented from expansion due to a reaction product, the durability of the refractory can be enhanced, and the life can be extended. Also, a solution having predetermined properties is coated to form a film on the refractory, whereby the life can be extended. Furthermore, the preset expansion allowance is satisfactorily ensured, so that even when the refractory expands in a hot state, the refractories can be prevented from squeezing together to cause a protrusion.

Figure 1:
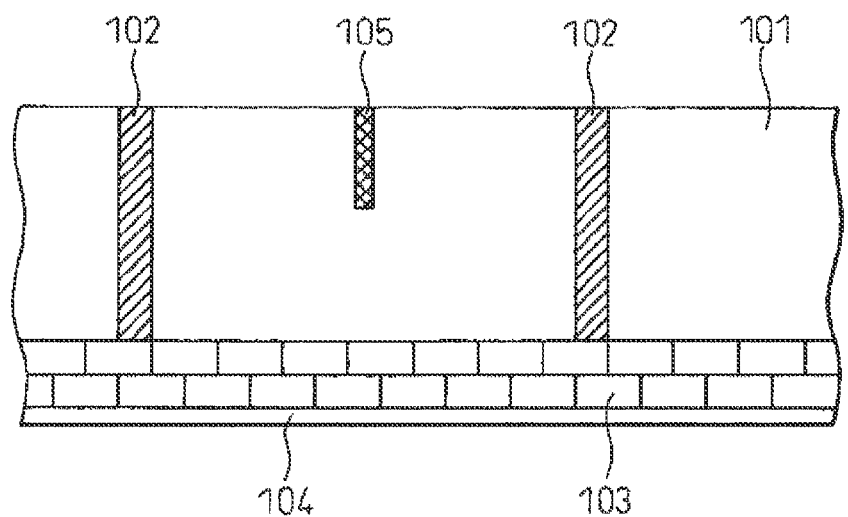
FIG. 1 is a schematic view explaining the preset expansion allowance.

In the Figs, the reference numerals are as follows: 100: rotary hearth furnace, 200: furnace, 210: outer wall, 220: refractory, 300: hearth, 400: burner, 500: pellet, 600: refractory, 610: glass film, 101: refractory, 102: compressible fire-resistant material, 103: heat insulating brick, 104: iron skin, and 105: score line.

BEST MODE FOR CARRYING OUT THE INVENTION

The embodiments of the present invention will be described below.

The following Table A provides examples of the refractory of the present invention, conventional examples, and a contrast example.

TABLE A

| PARTICLE DIAMETER | CONVENTIONAL EXAMPLE 1 | CONVENTIONAL EXAMPLE 2 | EXAMPLE 1 | EXAMPLE 2 | EXAMPLE 3 | CONTRAST EXAMPLE 1 |
|---|---|---|---|---|---|---|
| 3 mm OR MORE | MULLITE 10% | CHAMOTTE 5% | MULLITE 10% | MULLITE 10% | MULLITE 10% | MULLITE 10% |
| 1~3 mm | MULLITE 10% | CHAMOTTE 10% | MULLITE 10% | MULLITE 10% | MULLITE 10% | MULLITE 10% |
| 200 μm~1 mm | MULLITE 14% | CHAMOTTE 10% | MULLITE 14% | MULLITE 14% | MULLITE 10% | MULLITE 10% |
| 200 μm OR LESS | BAUXITE 50% | BAUXITE 59% | SiC 3% BAUXITE 47% | CHAMOTTE 3% BAUXITE 47% | SiC 3% CHAMOTTE 5% BAUXITE 46% | CHAMOTTE 12% BAUXITE 42% |
| 10 μm OR LESS | ALUMINA 5% SILICA 3% ALUMINA CEMENT 8% | ALUMINA 5% SILICA 3% ALUMINA CEMENT 8% | ALUMINA 5% SILICA 3% ALUMINA CEMENT 8% | ALUMINA 5% SILICA 3% ALUMINA CEMENT 8% | ALUMINA 5% SILICA 3% ALUMINA CEMENT 8% | ALUMINA 5% SILICA 3% ALUMINA CEMENT 8% |
| TEST RESULTS | 1.0% OR MORE | 0.5% | 0.2% | 0.2% | 0.1% | IMMEASURABLE |

The refractory is obtained by mixing powder particles differing in the particle size at a predetermined ratio and mixing a binder material to the mixture. In the examples of the present invention, particles having respective particle diameters are mixed at a ratio giving a closest packed structure when mixed. The particle diameters of the particles are classified into categories of 3 mm or more, from 1 to 3 mm, from 200 μm to 1 mm, 200 μm or less, and 10 μm or less. Incidentally, the particle diameter is classified by a sieve having a predetermined mesh.

In the examples of the present invention, one or more main raw materials selected from corundum, mullite, bauxite, chamotte, talc and silica, a binder material and an auxiliary raw material are contained, and the auxiliary raw material contains at least either one of 2 to 10 mass % of silicon carbide and 3 to 10 mass % of chamotte. Furthermore, the particle diameter of the silicon carbide or chamotte contained is 200 μm or less. As for the binder material, 10 mass % or less of an alumina cement and at least either one of 7 mass % or less of an ultrafine alumina powder having a particle diameter of 10 μm or less and 5 mass % or less of an ultrafine silica powder having a particle diameter of 10 μm or less are contained.

Specifically, in Examples 1 to 3, the main raw material is mullite.

In Example 1, 3 mass % of silicon carbide having a particle diameter of 200 μm or less is contained as the auxiliary raw material, and 8 mass % of an alumina cement, 5 mass % of an ultrafine alumina powder having a particle diameter of 10 μm or less and 3 mass % of an ultrafine silica powder having a particle diameter of 10 μm or less are contained as the binder material.

In Example 2, 3 mass % of chamotte having a particle diameter of 200 μm or less is contained as the auxiliary raw material, and 8 mass % of an alumina cement, 5 mass % of an ultrafine alumina powder having a particle diameter of 10 μm or less and 3 mass % of an ultrafine silica powder having a particle diameter of 10 μm or less are contained as the binder material.

In Example 3, 3 mass % of silicon carbide having a particle diameter of 200 μm or less and 5 mass % of chamotte having a particle diameter of 200 μm are contained as the auxiliary raw material, and 8 mass % of an alumina cement, 5 mass % of an ultrafine alumina powder having a particle diameter of 10 μm or less and 3 mass % of an ultrafine silica powder having a particle diameter of 10 μm or less are contained as the binder material.

Figure 2:
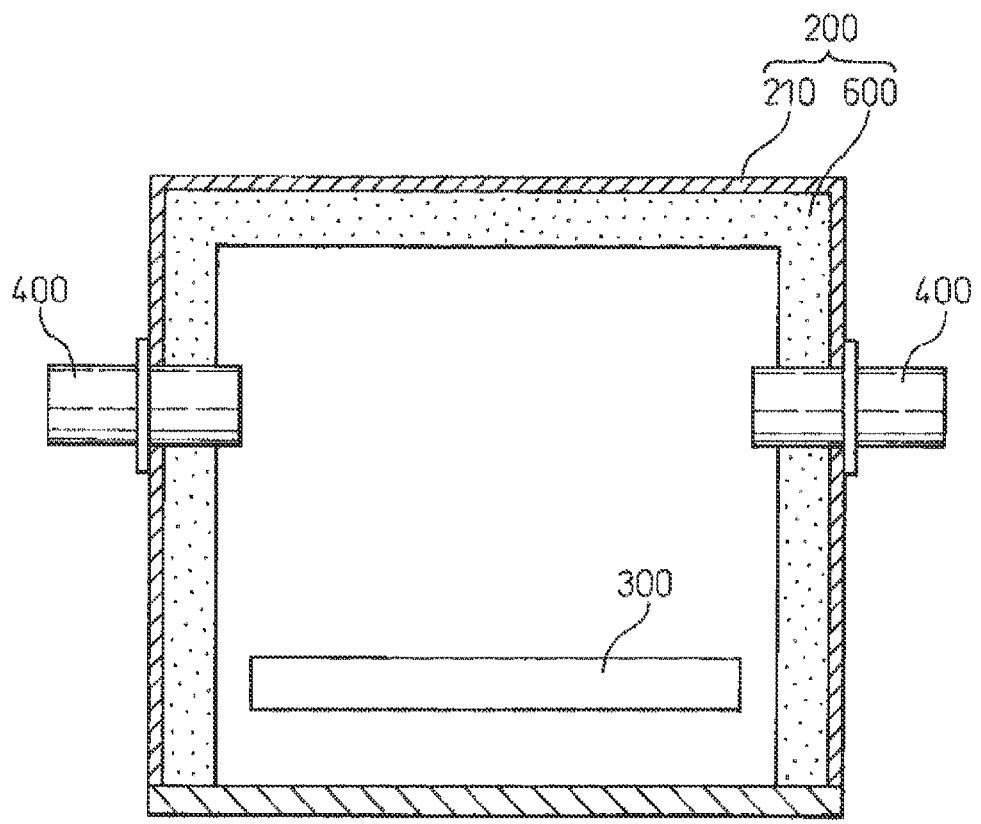
FIG. 2 is a view with cross-sectioning of the furnace of the rotary hearth furnace.
Figure 3:
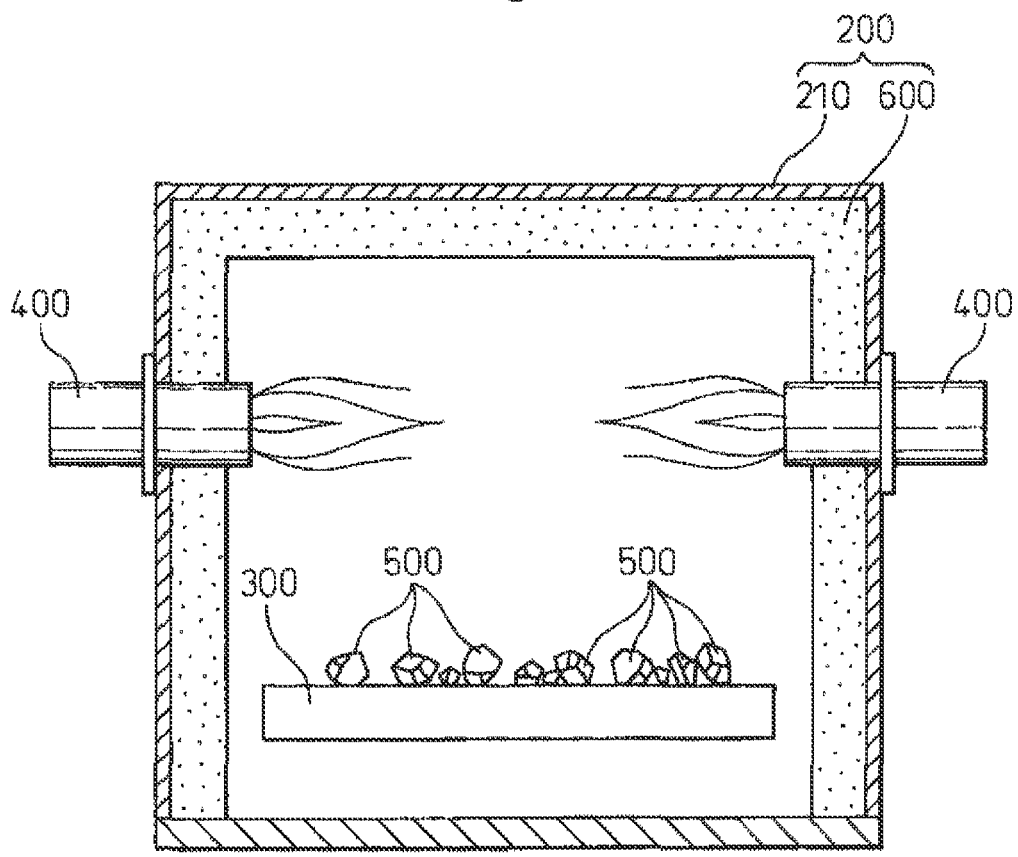
FIG. 3 is a view with cross-sectioning of the furnace of the rotary hearth furnace.
Figure 4:
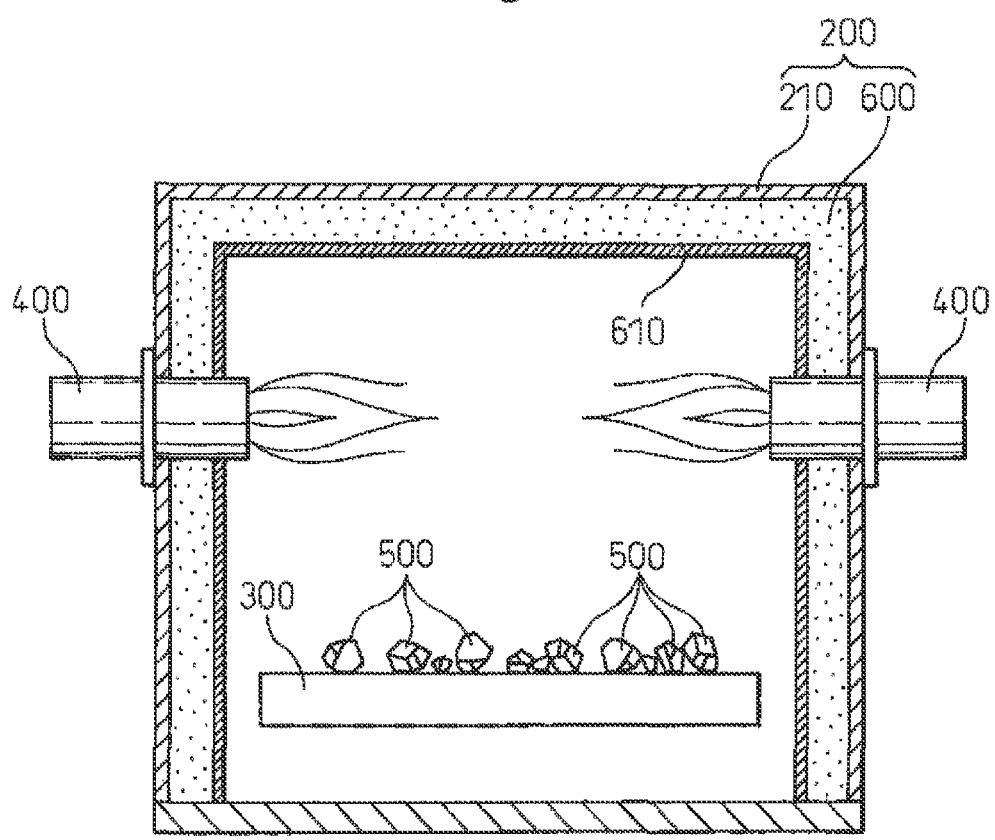
FIG. 4 is a view with cross-sectioning of the furnace of the rotary hearth furnace.

The embodiment of using the refractory having such a component composition and a particle diameter ratio for the lining of a furnace is described by referring to FIGS. 2 to 4.

Figure 9:
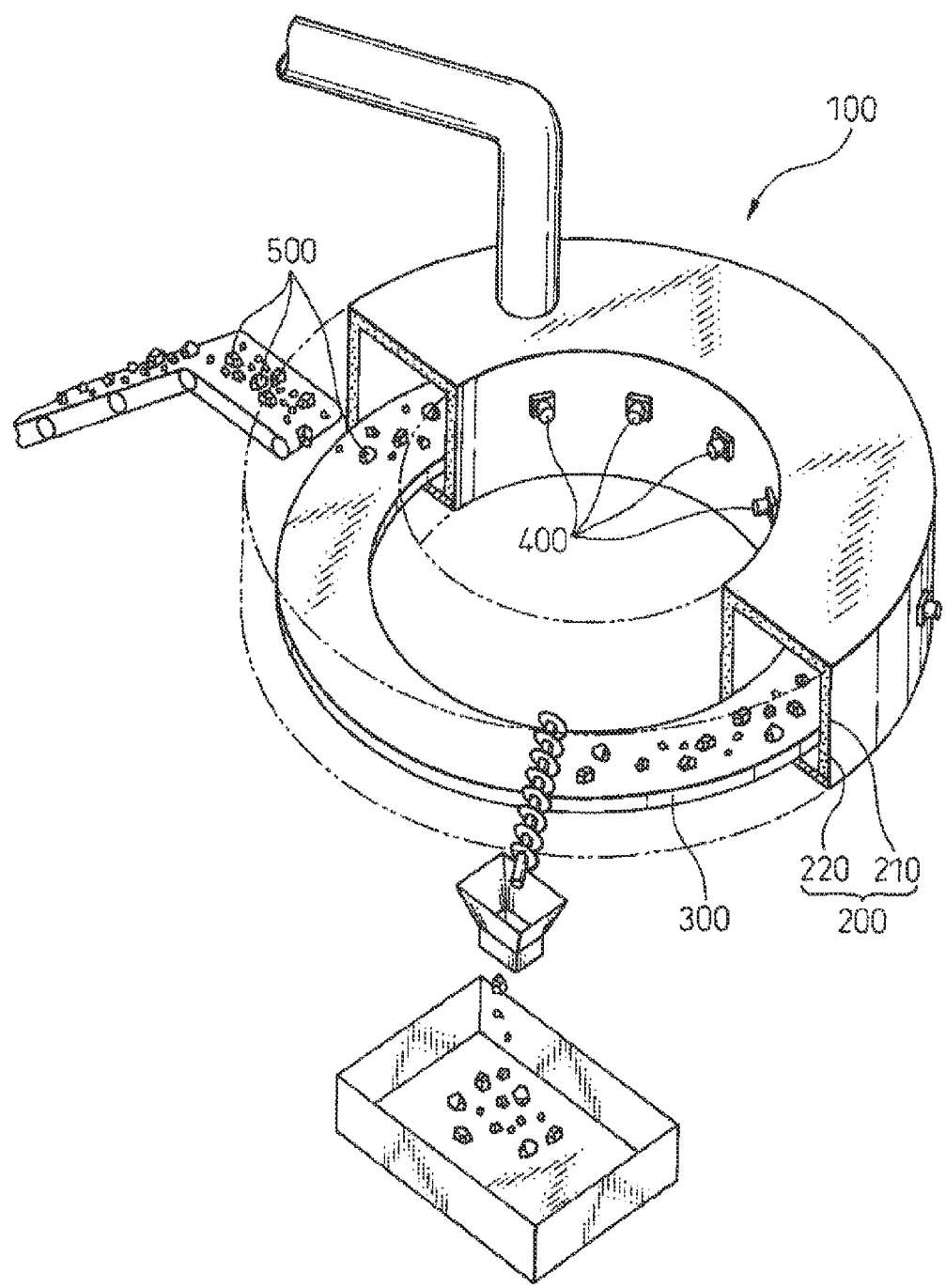
FIG. 9 is a view showing the rotary hearth-type reducing furnace.

FIGS. 2 to 4 are views with cross-sectioning of the furnace 200 of the rotary hearth furnace 100 described with respect to FIG. 9 (Background Art).

A refractory 600 after mixing, for example, according to Example 1, 2 or 3 is cast into the furnace to line the furnace with the refractory 600 (FIG. 2).

Then a pellet 500 of iron-making dust or sludge is supplied into the furnace and at the same time, a burner 400 is ignited to heat and warm the inside of the furnace to 750 to 1,300° C. (FIG. 3).

In this process, impurities such as zinc are removed from the pellet 500, and an alkali component contained in the pellet 500, such as alkali metal oxide ($Na_2O$, $K_2O$), carbonate or chloride, vaporizes directly or decomposes or is reduced and then vaporizes.

These alkali components are derived from the components thickened in the dust or sludge, and alkali components in a concentration of 0.1 mass % or more are detected. By hot-treating a pellet of this dust or sludge, 0.1 vol % or more of an alkali component comes to be contained in the atmosphere gas.

The alkali component vaporized from the pellet 500 reacts with silicon carbide and/or chamotte contained in the refractory 600, in the surface layer of the refractory 600. A product having a low melting point is produced by the reaction of the alkali component (Na or K) with silicon carbide and/or chamotte and at the same time, the surface layer is once melted due to the high temperature (750 to 1,300° C.) in the furnace and then vitrified. In consequence, as shown in FIG. 4, a glass film 610 is formed on the surface of the refractory 600.

When a glass film 610 is thus-formed as the surface layer of the refractory 600, the alkali component is blocked by the glass film 610 and does not intrude inside of the refractory 600, and volumetric expansion due to the reaction of the refractory 600 with an alkali does not occur, as a result, the durability of the refractory 600 is enhanced and the life of the refractory 600 is extended.

[1] EXAMPLES 1 TO 3

The results after testing the refractories obtained by the mixing of Examples 1, 2 and 3 of Table A are described below.

Examples 1, 2 and 3 according to the present invention, Conventional Examples 1 and 2, and Contrast Example 1 deviated from the component ratio of the present invention are tested.

The test method is described below.

Figure 5:
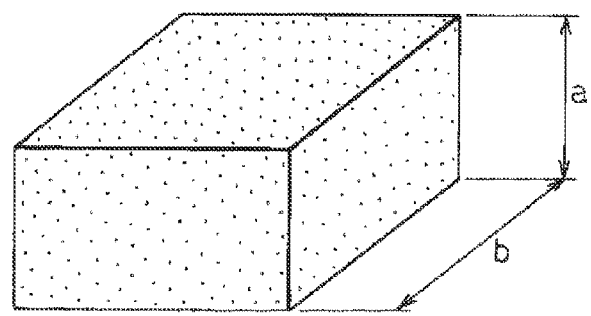
FIG. 5 is a view showing the shape of a sample.

The refractory having the component ratio and the particle size ratio in each of Examples 1 to 3, Conventional Examples 1 and 2 and Contrast Example 1 was caked into a brick shape shown in FIG. 5 to prepare samples. The sample size was 114 mm×65 mm×230 mm. Each sample was set in the manhole part positioned on the ¾ circumferential downstream side from the port for supplying a pellet 500 in an actual furnace of the rotary hearth furnace 100.

As for the rotary furnace, an actual furnace in Nippon Steel Kimitsu Works was used.

The temperature in the furnace was about 1,270° C., and the air ratio was about 0.95. The alkali components contained in the pellet were 1 mass % of $K_2O$ and 1 mass % of $Na_2O$. After an exposure test for 3 months in this state, the sample was recovered and the expansion was measured. The expansion measured was an average of respective expansion coefficients of the height a and the breadth b of the sample.

As a result of the test, expansion of 1.0 vol % or more was exhibited in Conventional Example 1, and expansion of 0.5 vol % was exhibited in Conventional Example 2. On the other hand, the expansion was 0.2 vol % in Examples 1 and 2, and the expansion was reduced to 0.1 vol % in Example 3. In Contrast Example 1, a melted portion was generated in the sample, and the expansion could not be measured.

Also, a refractory sample according to each Example was cut out, embedded in a resin and polished, and the thickness of the vitrified layer was measured by observing the texture of the cross-section, as a result, the thickness of the vitrified layer on the refractory surface in each Example was nearly 300 μm in Example 1, nearly 300 μm in Example 2, and nearly 200 mm in Example 3.

From the test above, the effects of the present invention were confirmed.

Figure 6:
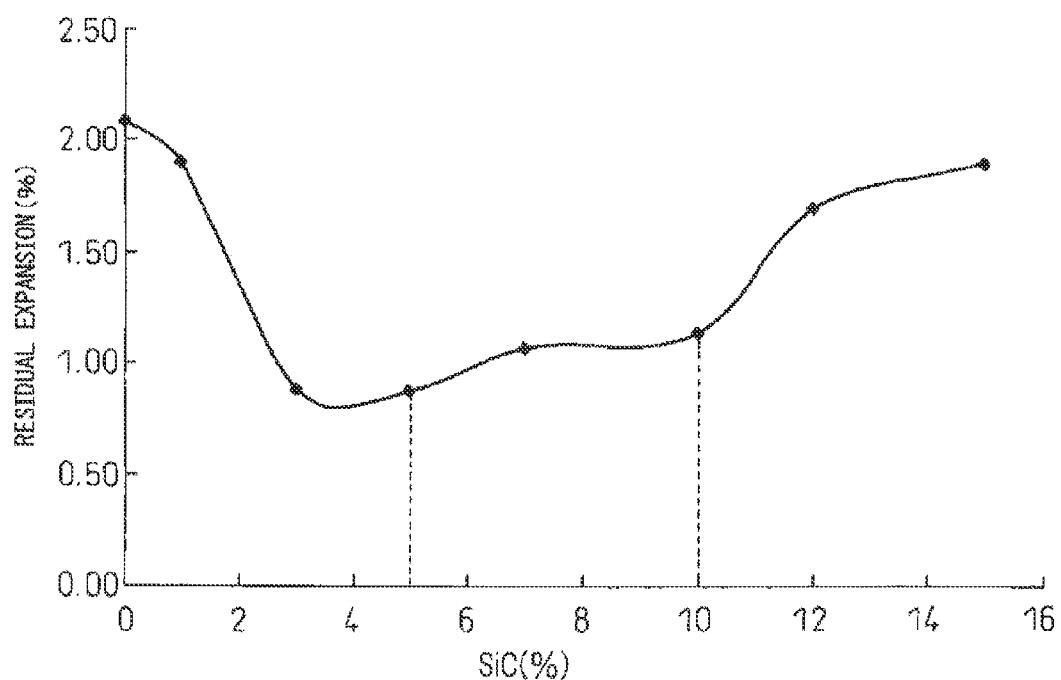
FIG. 6 is a view showing the relationship between the silicon carbide content and the residual expansion.
Figure 7:
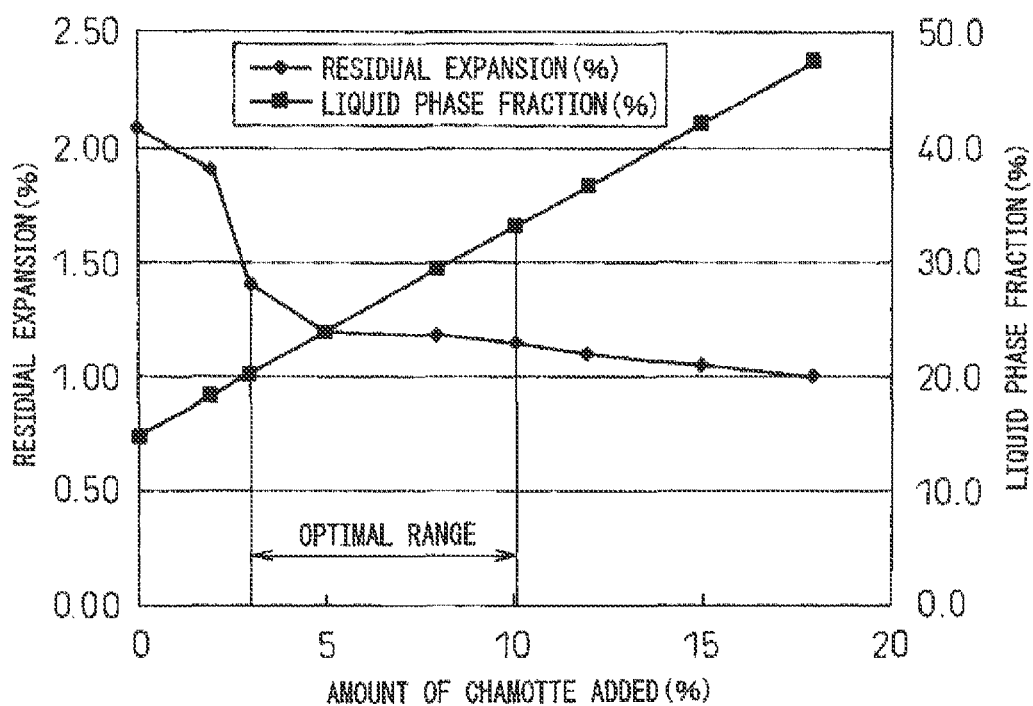
FIG. 7 is a view showing the relationship between the residual expansion and the liquid phase fraction with respect to the chamotte content.

FIG. 6 is a graph showing the relationship between the silicon carbide content and the residual expansion, and FIG. 7 is a view showing the relationship between the residual expansion and the liquid phase fraction with respect to the chamotte content. In FIG. 7, the liquid phase fraction is the theoretical value in the state of 1,300° C. Data of FIGS. 6 and 7 are shown in Tables 1 and 2, respectively.

TABLE 1

| Amount of SiC Added (%) | Residual Expansion (%) |
|---|---|
| 0 | 2.08 |
| 1 | 1.90 |
| 3 | 0.88 |
| 5 | 0.87 |
| 7 | 1.06 |
| 10 | 1.13 |
| 12 | 1.70 |
| 15 | 1.90 |

TABLE 2

| Amount of Chamotte Added (%) | Residual Expansion (%) | Liquid Phase Fraction (%) |
|---|---|---|
| 0 | 2.08 | 15.0 |
| 2 | 1.90 | 18.6 |
| 3 | 1.40 | 20.4 |
| 5 | 1.20 | 24.0 |
| 8 | 1.18 | 29.4 |
| 10 | 1.15 | 33.0 |
| 12 | 1.10 | 36.6 |
| 15 | 1.05 | 42.0 |
| 18 | 1.00 | 47.4 |

In FIG. 6, it is seen that when the content of silicon carbide becomes less than 2 mass %, the residual expansion increases. This is considered to occur because the glass film formed on the refractory surface is incomplete due to too small content of silicon carbide and the alkali component-containing gas intrudes inside of the factory, as a result, the reaction between the refractory, and an alkali proceeds.

Furthermore, it is seen that when the silicon carbide content exceeds 10 mass %, the residual expansion of the refractory also increases. This is considered to occur because when the silicon carbide content is excessively large, the effect of volumetric expansion of a reaction product produced by the reaction between the silicon carbide itself and the alkali component-containing gas becomes large. Accordingly, the silicon carbide content is preferably adjusted to be from 2 to 10 mass %.

In FIG. 7, it is seen that when the chamotte content increases, the residual expansion becomes small. Accordingly, the chamotte content is found to be preferably 3 mass % or more which allows the formation of an effective glass film on the refractory surface. On the other hand, it is seen that when the chamotte content increases, the melting point of the refractory decreases and the liquid phase fraction becomes high due to a large rate of melting. Accordingly, the chamotte content needs to be set not to cause excessive decrease of the melting point of the refractory. For these reasons, the chamotte content is preferably adjusted to be from 3 to 10 mass %.

[2] EXAMPLES 4 TO 6

Table 3 shows Examples 4, 5 and 6 of the solution coated on the refractory surface. The solutions all start melting at 750° C. or more and have a viscosity at 1,200° C. of 0.1 Pa·s or more. The effect when the inside of the rotary hearth reducing furnace 100 of FIG. 9 is lined with the above-described castable refractory and coated with a coating material is described.

TABLE 3

| | Example 4 | Example 5 | Example 6 |
|---|---|---|---|
| $Al_2O_3$ | 15 | 5 | 8 |
| $SiO_2$ | 78 | 80 | 72 |
| $LiO_2$ | 4 | — | — |
| MgO | 3 | — | — |
| $B_2O_3$ | — | 10 | 12 |
| $Na_2O$ | — | 5 | 8 |

The coating materials of Examples 4 to 6 each was off-line coated on the material of Example 1, a refractory sample coated with the coating material of each Example was cut out, embedded in a resin and polished, and the texture of the cross-section was observed to measure the film thickness of the coating material, as a result, the film thickness of the coating material was nearly 100 μm in all samples.

Subsequently, an exposure test was performed using an actual furnace of the rotary hearth furnace 100 in the same manner as in the method above. The material itself of Example 1 on which nothing is coated, and the material of Example 1 which is coated with the coating material of Example 5 under the same conditions as in the off-line coating above, were prepared. The sample size was 114 mm ×65 mm×230 mm. Each sample was set in the manhole part positioned on the ¾ circumferential downstream side from the port for supplying a pellet 500 in an actual furnace of the rotary hearth furnace 100.

As for the rotary furnace, an actual furnace in Nippon Steel Kimitsu Works was used.

The temperature in the furnace was about 1,270° C., and the air ratio was about 0.95. After the exposure test for 3 months in this state, the sample was recovered and the expansion was measured. The expansion measured was an average of respective expansion coefficients of the height a and the breadth b of the sample.

Figure 8:
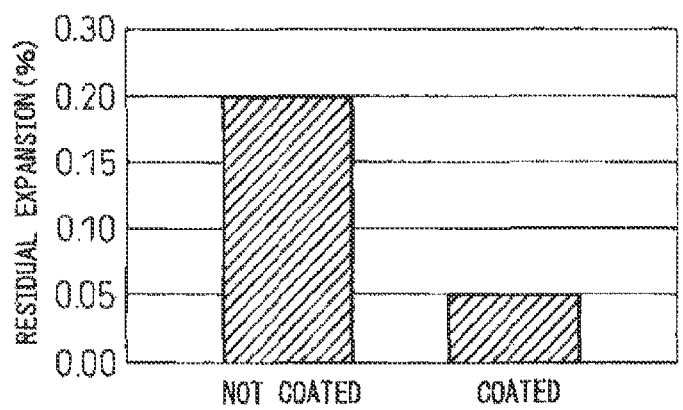
FIG. 8 is a view showing the effect of solution coating on the residual expansion.

As a result of the test, as shown in FIG. 8, expansion of 0.2 vol % was exhibited in the sample not coated with the coating material of Example 5, but the expansion could be reduced to 0.05 vol % in the coated sample.

Also, the sample after the exposure test was collected by core boring, and the cross-section of the collected refractory was observed, as a result, a part of the coating material was separated and it could be confirmed that although the coating material is separated during exposure, the expansion can be more reduced by coating the coating material.

How the design of a castable refractory is applied to an actual furnace is described below.

The service temperature is first determined from the intended operation conditions. Based on the service temperature, the theoretical expansion of the refractory is determined from the hot linear expansion coefficient measured according to JIS R 2555. Then, a preset expansion allowance is arbitrarily determined within the range of upper and lower limits of the following formula (1). Thereafter, the number n of score lines, the distance $B_i$, and the section-to-section distance A corresponding to the percentage compressibility of the compressible fire-resistant material used are determined to match the preset expansion to be ensured.

$$0.5 \times D \leq pA + \sum_{i=0}^{n} Bi \leq 2 \times D \quad (1)$$

(wherein i and n each is an integer of 0 or more).

The furnace design theory using formula (1), is described below with reference to, for example, the construction of a rotary hearth furnace.

In constructing a rotary hearth furnace, a case of constructing castable walls at intervals of about 2 m by using the refractory of Example 1 is as follows:

The service temperature is set to 1,300° C. from the intended operation conditions. The theoretical expansion coefficient at this temperature is found to be 0.8% according to JIS R 2555. As a result, the theoretical expansion on the operating surface becomes 16 mm.

From formula (1), a preset expansion allowance of 8 to 32 mm is preferably ensured. Therefore, a case of selecting securement of a preset expansion allowance of 32 mm is simulated here.

The score line is provided only at one portion, and a distance of 11 mm is secured. Then, the remaining expansion allowance of 21 mm must be covered by the distance between refractory sections. A ceramic fiber of $Al_2O_3$—$SiO_2$ having a percentage compressibility of 70% is applied to the space between refractory sections and therefore, the distance A between sections becomes:

$$0.7 \times A = 32 \text{ mm} - 11 \text{ mm} = 21 \text{ mm}$$

$$A = 21 \text{ mm} \div 0.7 = 30 \text{ mm}.$$

In this way, the refractory construction can be designed to match the preset expansion.

Incidentally, the present invention is not limited to the above-described embodiment, and modifications, reformations and the like within the range enabling to achieve the object of the present invention are included in the present invention.

For example, mullite is used as the main raw material in the Examples, but the main raw material may be selected from one or more of corundum, mullite, bauxite, chamotte, talc and silica.

The particle diameter ratio is not particularly limited, and powders from coarse particles to fine particles may be mixed at a predetermined ratio. However, the ratio is preferably a ratio of a dense refractory when mixed.

In view of purport of the present invention, the particle diameter of silicon carbide and chamotte contained is preferably 200 μm or less but is not limited thereto. For example, the particle diameter may be sufficient if it is small enough to allow for appropriate vitrification, and may be 300 μm or less.

Also, the embodiment above is described by referring to use as the refractory of a rotary hearth furnace, but the present invention can be utilized in other various uses.

For example, the present invention may be applied to the blast-furnace shaft part having an in-furnace temperature of 400 to 1,500° C. and a reducing atmosphere.

Alternatively, the present invention may be applied to ceiling part, regenerative chamber wall or the like not coming into contact with molten glass in a glass melting furnace. It is known that in these portions, an alkali vapor is generated from glass, the temperature is a temperature of 750 to 1,400° C., and the refractory is damaged by erosion with the alkali vapor.

Furthermore, in an incinerator, the present invention may be applied to a portion where the temperature is from 750 to 1,200° C. and an alkali vapor is present. For example, in the case of a stoker system, the present invention can be applied to a wall portion from combustion stage to post-combustion stage, and in the case of a fluidized bed system, to a free board part, a gas cooling chamber top or the like.

INDUSTRIAL APPLICABILITY

The present invention can be suitably used in a gas furnace where an alkali vapor is generated.

The invention claimed is:

1. A refractory lining for use in an environment exposed to an alkali metal component containing hot gas atmosphere, the refractory lining comprising a castable refractory, formed inside a kiln, wherein the castable refractory comprises:
   at least one of 2 to 10 mass % of silicon carbide and 3 to 10 mass % of chamotte, as an auxiliary raw material, and a binder material, with a balance of one or more main raw materials selected from the group consisting of corundum, mullite, bauxite, talc and silica;
   the refractory lining having a vitrified layer produced as a surface layer, the surface layer having a thickness of 30 μm to 1 mm.

2. The refractory lining as claimed in claim 1 wherein said binder material comprises a mixture containing 10 mass % or less of an alumina cement and at least one of 7 mass % or less of ultrafine alumina powder having a particle diameter of 10 μm or less and 5 mass % or less of ultrafine silica powder having a particle diameter of 10 μm or less.

3. The refractory lining as claimed in claim 1, wherein at least one of said 2 to 10 mass % of silicon carbide and said 3 to 10 mass % of chamotte has a particle diameter of 200 μmm or less.

4. The refractory lining as claimed in claim 1, further comprising:
   a coating formed on a surface of the castable refractory from a solution comprising silica as the main component and an alkali metal oxide and alumina, the solution having a melting point of 750° C. or more for exposure to the alkali metal component-containing hot gas atmosphere.

5. A kiln, comprising a plurality of sections, the sections lined with a refractory lining of a castable refractory and having a compressible fire-resistant material applied between adjacent sections, the castable refractory comprising:
   at least one of 2 to 10 mass % of silicon carbide and 3 to 10 mass % of chamotte, as an auxiliary raw material, and a binder material, with a balance of one or more main raw materials selected from the group consisting of corundum, mullite, bauxite, talc and silica;
   the refractory lining having a vitrified layer produced as a surface layer, the surface layer having a thickness of 30 μm to 1 mm; and
   wherein the preset expansion allowance of each section is in the range of the following formula (1) with respect to the theoretical expansion (D) of said refractory at the service temperature:

$$0.5 \times D \leq pA + \sum_{i=0}^{n} Bi \leq 2 \times D \quad (1)$$

A: the distance to the adjacent section,
p: the percentage compressibility of the compressible fire-resistant material,
Bi: the length in the width direction of a cut line provided at least on the in-furnace side of the castable refractory constituting the section,
D: the theoretical expansion of the castable refractory at the service temperature, and
i and n: an integer of 0 or more.

* * * * *

UNITED STATES PATENT AND TRADEMARK OFFICE
CERTIFICATE OF CORRECTION

PATENT NO. : 8,076,255 B2  
APPLICATION NO. : 12/084015  
DATED : December 13, 2011  
INVENTOR(S) : Satoru Ito et al.

Page 1 of 1

It is certified that error appears in the above-identified patent and that said Letters Patent is hereby corrected as shown below:

In the Specification:

Column 10, line 60, change "200 mm" to -- 200 μm --;

In the Claims:

Column 14, line 27, change "200 μmm" to -- 200 μm --.

Signed and Sealed this
Tenth Day of December, 2013

Margaret A. Focarino
*Commissioner for Patents of the United States Patent and Trademark Office*